United States Patent [19]
Krueger et al.

[11] Patent Number: 4,485,221
[45] Date of Patent: Nov. 27, 1984

[54] PROCESS FOR MAKING EPOXY NOVOLAC RESINS WITH LOW HYDROLYZABLE CHLORINE AND LOW IONIC CHLORIDE CONTENT

[75] Inventors: Ulf A. Krueger, Coventry; Yel S. Sury, Warwick, both of R.I.

[73] Assignee: Ciba-Geigy Corporation, Ardsley, N.Y.

[21] Appl. No.: 548,273

[22] Filed: Nov. 3, 1983

[51] Int. Cl.$^3$ .................... C08G 59/08; C08G 59/14
[52] U.S. Cl. .................................................. 525/507
[58] Field of Search ........................................ 525/507

[56]  References Cited
U.S. PATENT DOCUMENTS 4,102,866  7/1978  Speranza et al. .................... 525/507
4,447,598  5/1984  Caskey et al. .................. 525/507 X

FOREIGN PATENT DOCUMENTS 58-122915  7/1983  Japan .

OTHER PUBLICATIONS

J. Cason et al., J. Org. Chem. 18,850 (1953).

Primary Examiner—Earl A. Nielsen
Attorney, Agent, or Firm—Luther A. R. Hall

[57] ABSTRACT

A process for making glycidyl ethers of novolac resins, particularly phenol or cresol novolacs, with low hydrolyzable chlorine and low ionic chloride content, said resins prepared by reaction of a novolac resin with epichlorohydrin in an alkaline medium, comprises dissolving the crude epoxy novolac resin in an inert organic solvent, treating the solution obtained with an excess amount of an alkali metal alkoxide, neutralizing the excess alkali with a weak acid, removing the alkali metal chloride formed by filtration in the presence of a filter aid and isolating the epoxy novolac resin by distillation of the solvent.

14 Claims, No Drawings

PROCESS FOR MAKING EPOXY NOVOLAC RESINS WITH LOW HYDROLYZABLE CHLORINE AND LOW IONIC CHLORIDE CONTENT

FIELD OF THE PRESENT INVENTION

The present invention pertains to an improved process for producing glycidyl ethers of novolac resins, particularly phenol or cresol novolacs, to obtain such epoxy cresol novolac (ECN) or epoxy phenol novolac (EPN) resins with low hydrolyzable chlorine and low ionic chloride contents.

BACKGROUND OF THE INVENTION

The epoxy cresol novolac (ECN) resins have become important items of commerce with a myriad of users based on their highly desirable physical properties after curing. These ECN resins with a multiplicity of glycidyl ether groups in each molecule lead to cured resins with high crosslink density and great rigidity. Such properties are particularly important in the electronic industry for circuit boards and other end-uses.

Epoxy novolac resins are prepared by reacting a novolac resin with excess epichlorohydrin, based on the phenolic hydroxyl group of the novolac resin, in a strongly alkaline medium, such as aqueous sodium hydroxide, to give first the corresponding chlorohydrin ether intermediate which is then dehydrochlorinated to form the desired glycidyl ether or epoxy novolac resin product.

The process is illustrated schematically below with a cresol novolac resin.

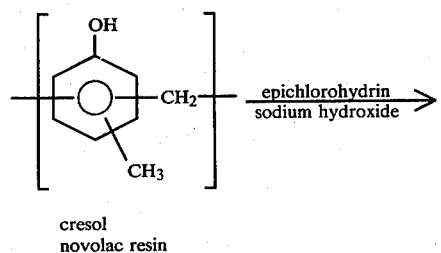

cresol novolac resin

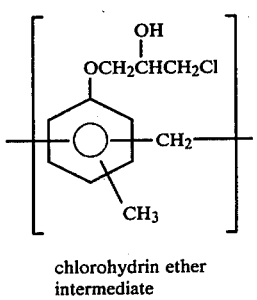

chlorohydrin ether intermediate

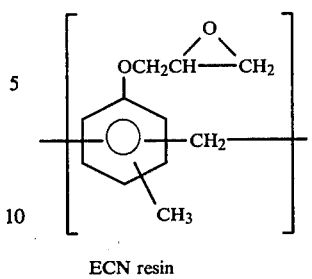

ECN resin

Ideally all the chlorohydrin ether intermediate is converted by dehydrochlorination into the epoxy novolac resin leaving "no" reactive chlorine content in the final product. Such chlorine if still present would be potentially reactive in the presence of moisture or chemical reagents and is designated as hydrolyzable chlorine. The presence of such hydrolyzable chlorine would clearly have detrimental and deleterious effects on the final properties of the cured epoxy novolac resins particularly in the electrical and electronics industries where low chlorine and alkali metal ion contents are needed for the flawless encapsulating of electronic devices. The cured epoxy novolac resins must have low electric conductivity to minimize the electrical failure of electronic devices such as memory chips and semiconductors. Commercial ECN resins do not always meet these purity requirements.

The use of potassium tert-butylate to effect the dehydrohalogenation of alpha-halocarboxylic acids has been reported by J. Cason et al, J. Org. Chem. 18, 850 (1953).

The use of such alkali metal alkoxides with the dehydrohalogenation of epoxy resins, particularly EPN or ECN resins, is unknown.

OBJECT OF THE INVENTION

The object of the instant invention is a method or process to prepare epoxy cresol novolac (ECN) or epoxy phenol novolac (EPN) resins with a hydrolyzable chlorine content of less than 100 ppm and an ionic chloride content of less than 1 ppm.

DETAILED DISCLOSURE

The instant invention pertains to a process for making an epoxy novolac resin with a hydrolyzable chlorine content under 100 ppm and with an ionic chloride content of under 1 ppm, which comprises dissolving the crude epoxy novolac resin, prepared by the reaction of a novolac resin with epichlorohydrin in an alkaline medium, in a inert organic solvent, reducing the water content of the organic solution to less than 0.1% by weight, adding to the essentially anhydrous solution an alkali metal alkoxide, dissolved in an alkanol or in another suitable solvent, in an amount which is 105–200% of the theoretical equivalent amount required to complete the dehydrochlorination reaction, based on the content of hydrolyzable chlorine in the crude resin, at a temperature of 20°–140° C., preferably 80°–110° C., adding 0.2 to 2% by weight of water, based on the crude resin solution, neutralizing the excess alkali metal alkoxide by the addition of a weak acid at 20°–50° C. until a pH value of 3 to 6 is attained, removing the alkali metal chloride formed by treatment with from 0.5 to 5% by weight of the crude resin solution of a filter aid or mixture of filter aids followed by filtration, and isolating the epoxy novolac resin by vacuum distillation of the inert organic solvent at a temperature of 100°–200° C., preferably 130°–135° C.

The epoxidized novolac resins prepared by the instant process exhibit hydrolyzable chlorine contents under 100 ppm and ionic chloride contents under 1 ppm. The amounts of hydrolyzable chlorine found in conventional EPN or ECN resins are in the range of 200 to 1500 ppm whereas the instant process leads to EPN or ECN resins with hydrolyzable chlorine levels under 100 ppm and as low as 30–40 ppm.

In respect to ionic chloride content, conventional EPN or ECN resins have ionic chloride levels in the 5–15 ppm range whereas the instant process produces EPN or ECN resins with less than 1 ppm ionic chloride.

In respect to alkali metal ion, i.e. sodium or potassium, content, conventional EPN or ECN resins have sodium or potassium ion contents up to 5 ppm while EPN or ECN resins made by the instant process have sodium or potassium ion contents generally under 1 ppm.

The polyhydric phenols useful in the instant invention are the novolac resins obtained by the acid-catalyzed condensation of monophenols such as phenol, o-cresol, m-cresol, p-cresol and other alkylated phenols, with aldehydes such as formaldehyde, acetaldehyde, crotonaldehyde, isobutyraldehyde and the like. The preferred novolac resins are the phenol or cresol novolacs prepared from phenol, o-cresol, m-cresol or p-cresol with formaldehyde.

Alkali metal hydroxides in the sense of the invention are also to be understood as alkali metal hydroxides which contain up to 5% by weight of alkali metal carbonate or mixtures of alkali metal hydroxide and alkali metal carbonate, wherein the alkali metal carbonate content should be at most 5% by weight.

The crude epoxy novolac resin is dissolved in an inert organic solvent which is an aromatic hydrocarbon such as benzene, chlorobenzene, toluene or xylene, preferably toluene or xylene, or a ketone, such as methyl ethyl ketone, methyl isobutyl ketone or similar dialkyl ketone, preferably methyl isobutyl ketone.

After reducing the water content of the epoxy novolac resin solution to less than 0.1% by weight, conveniently by azeotropic distillation, the essentially anhydrous solution is treated with an excess amount (105–200% of the theoretical amount needed to complete dehydrochlorination based on the hydrolyzable chlorine content of the crude epoxy novolac resin) of an alkali metal alkoxide dissolved in the alkanol or other suitable solvent at a temperature of 20°–140° C., preferably at 80°–110° C.

The alkali metal alkoxides are for example sodium methylate, sodium ethoxide, potassium tert-butylate or sodium or potassium tert-amylate. The alkali metal salts of glycols, diglycols and polyglycols as well as the alkali metal salts of corresponding monoalkyl ethers of said glycols are also effective in the dehydrochlorination reaction. Examples of alkali metal alkoxides useful in the instant process are sodium methylate, sodium ethoxide, sodium n-propylate, sodium isopropylate, potassium n-propylate, potassium isopropylate, sodium tert-butylate, potassium tert-butylate, sodium tert-amylate, potassium tert-amylate, sodium or potassium salt of 2-methoxyethanol, of 2-butoxyethanol or of poly(ethylene glycol) (PEG 400).

Potassium tert-butylate is especially preferred.

The alkali metal salt of tert-alkanols are especially preferred for their high effectiveness in the dehydrochlorination reaction and the minimum increase in resin viscosity occurring with their use. Their good solubility in the organic solvent/resin mixture assures high effectiveness with minimum mixing thus not requiring high-powered mixing devices.

The alkanols useful in the instant process include methanol, ethanol, n-propanol, tert-butanol, tert-amyl alcohol and the like.

Other suitable solvents include the glycols, diglycols and polyglycols as well as the monoalkyl ethers thereof. The aromatic hydrocarbons, such as toluene, and the like, and the dialkyl ketones, such as methyl isobutyl ketone, may also be used in the instant process. Examples of said glycols are ethylene, propylene or butylene glycol. Examples of said diglycols are diethylene or dipropylene glycol. Examples of said polyglycols are triethylene glycol or polyethylene glycols (PEG) with an average molecular weight of 400 to 6000. Examples of the monoalkyl ethers include 2-methoxyethanol, 2-butoxyethanol, methyl carbitol, ethyl carbitol and butyl carbitol.

Particularly preferred solvents for dissolving the alkali metal alkoxide in the instant process include methanol, tert-butanol and toluene.

The alkali metal hydroxides commonly used for the dehydrohalogenation of EPN or ECN resins are less selective in the dehydrohalogenation reaction resulting in side reactions such as resin advancement leading to undesired increases in resin viscosity which adversely affects the flow properties of said resins in many end-use applications. The poor miscibility of aqueous alkali metal hydroxide solutions in the hydrophobic resin solution reduces their effectiveness in the dehydrohalogenation reaction. High-powered mixing devices are needed for their dispersion. Epoxy values of EPN or ECN resins prepared by the instant process are not significantly lowered by said process.

When the dehydrochlorination is complete, the excess alkali metal alkoxide is neutralized by the addition of a weak acid at 20°–50° C. until the resulting solution has a pH below 7, preferably in the 3 to 6 pH range.

The weak acid may be carbonic acid, possibly added as solid chunks of dry ice, or a lower alkanoic acid such as acetic acid or may be an aqueous solution of an acid salt such as sodium hydrogen sulfate or the like, or an acidic clay. Preferably carbonic acid, acetic acid or an acidic clay is used as the weak acid.

The alkali metal chloride formed during the dehydrochlorination step as well as any alkali metal salt formed during neutralization of the excess alkali metal alkoxide is removed then by filtration with the assistance of a filter aid or combination of filter aids. The presence of 0.2 to 2%, preferably 0.5 to 1%, by weight of water enhances the effectiveness of such filter aids.

The amount of filter aid or mixture of filter aids is at least 0.5% by weight of the crude resin solution being filtered and is adjusted upward as the amount of salt (ionic chloride) to be removed increases. The upper limit of the amount of filter aid is determined by filter capacity and by economic considerations. Amounts as high as 5% by weight may be used, but amounts seldom exceed 2% by weight of the crude resin solution being filtered.

The filtration apparatus can be of the simple Sparkler or Ertel types or continuous filtering equipment can also be employed.

Conventional EPN or ECN resins are treated by aqueous washing procedures to remove traces of residual ionic impurities. Emulsions are often encountered and liquid-liquid phase separating equipment is needed. Such procedures are generally unable to lower ionic chloride contents to the desired level of under 1 ppm.

The use of the filter aid, especially a clay, reduces ionic chloride contents to under 1 ppm and concomitantly yields EPN or ECN resins of low sodium or potassium content and with low electric conductivity (generally less than 10 μmhos/cm 100 grams).

The filter aids found useful in the instant process include fibrous cellulose powder (such as Solka Floc, Brown Co., New York), diatomaceous earth (such as Celite, Johns-Manville, Manville, N.J.) or various natural clays such as attapulgites, bentonites, montmorillonites and the like as well as acid treated bentonites (such as Filtrol, Filtrol Corp., Los Angeles). The neutral, untreated clays are preferred to the acid-treated clays since the hydrolyzable chlorine values are lower when the neutral clays are used.

Preferably the filter aid is fibrous cellulose, diatomaceous earth, attapulgite, bentonite or montmorillonite or mixtures thereof.

After filtration is complete, the epoxy novolac resin solution is vacuum distilled to remove the aromatic hydrocarbon or ketone solvent at a temperature of 100°–200° C., preferably 130°–135° C. Sparging with an inert gas such as nitrogen facilitates the fast removal of solvent (volatiles) to give the desired epoxy novolac resin. Batch or continuous distillation can be employed.

Alternative methods of removing the excess alkali metal alkoxides and alkali metal salts (chlorides) from the epoxy novolac resin solution include the use of ion exchange processes or electrofilters.

While the use of the filter aid in a filtration step of the instant process is sufficient to prepare the EPN or ECN resins having low hydrolyzable chlorine and low ionic chloride content, in some particular cases it may be convenient to precede the filter aid filtration step with an aqueous extraction step (batchwise or continuous) using a liquid/liquid centrifuge to facilitate the removal of alkali metal salts from the epoxy novolac resin solution.

The following examples are presented for the purposes of illustration only and are not to be construed to limit the nature or scope of the instant invention in any manner whatsoever.

EXAMPLE 1

To a 1-liter flask equipped with an agitator, thermometer, condenser and Dean-Stark water separator is charged 700 grams of a 40% solution of an epoxy cresol novolac (ECN) resin in toluene containing 260 ppm of hydrolyzable chlorine (HC) and somewhat less than 10 ppm of ionic chloride (IC). The toluene solution is refluxed at about 110° C. and water is removed using the separator by azeotropic distillation with the distilled toluene being returned to the flask till the water content of the solution is 0.05% or less. The temperature of the toluene solution is reduced to 105° C. and with good agitation 6.4 grams of a 14% by weight solution of potassium tert-butylate in tert-butanol is added. This is equivalent to 150% of the theoretical amount of hydrolyzable chlorine present. The mixture is then stirred at 105° C. for 30 minutes and then cooled to 45° C.

To the cooled mixture is added 3.5 grams of water and then 10 grams of carbon dioxide in the form of dry ice chunks is charged over a 15-minute period while keeping the temperature at 45° C. The pH of a sample of the mixture, diluted with water and acetone, is less than 7.

To the mixture is now added 3.5 grams of fibrous cellulose powder ("Solka Floc", Brown Co., New York), 3.5 grams of diatomaceous earth ("Celite" 535, Johns Manville, Manville, N.J.) and 10 grams of neutral attapulgite clay (clay 100 up/RVM, Engelhard Minerals & Chemicals, Edison, N.J.). The mixture is stirred for one hour and then filtered through a pressure filter using a 1-micron filter pad precoated with "Celite".

The toluene solvent is then removed by vacuum distillation with temperature of the still pot rising gradually from 50° C. to 135° C. Vacuum distillation is continued until the volatiles content is 0.25% by weight or less with the still pot temperature not exceeding 135° C. The epoxy cresol novolac (ECN) resin product obtained is discharged as a melt and is flaked.

Analysis shows 52 ppm hydrolyzable chlorine, 0.6 ppm ionic chloride, viscosity at 130° C. of 2240 centipoise (2240 mPa s), 1.3 ppm sodium, 1.0 ppm potassium and a conductivity of 10.2 μmhos/cm 100 grams.

EXAMPLE 2

When the procedure of Example 1 is repeated on a large scale in a 3000 gallon (11,355 m$^3$) reactor, the ECN resin obtained analyzes as follows:
 48 ppm hydrolyzable chlorine
 0.8 ppm ionic chloride
 0 ppm sodium
 0 ppm potassium
 2.3 μmhos/cm 100 grams conductivity

EXAMPLE 3

The procedure of Example 1 is repeated except that 0.15 grams of glacial acetic acid dissolved in 3.5 grams of water is used instead of the carbon dioxide to neutralize the potassium tert-butylate. The ECN resin obtained analyzes as follows:
 48 ppm hydrolyzable chlorine
 1.1 ppm ionic chloride
 0.7 ppm sodium
 0.4 ppm potassium
 2190 centipoise (2190 mPa s) viscosity at 130° C.
 9.9 μmhos/cm 100 grams conductivity

EXAMPLE 4

When the procedure of Example 1 is repeated except that sodium methylate in methanol is used instead of potassium tert-butylate, the ECN resin obtained analysis as follows:
 60 ppm hydrolyzable chlorine
 0.4 ppm ionic chloride
 6.95 μmhos/cm 100 grams conductivity

EXAMPLE 5

When the procedure of Example 1 is repeated with potassium tert-amylate in toluene instead of potassium tert-butylate in tert-butanol, the ECN resin obtained analyses as follows:
 82 ppm hydrolyzable chlorine
 0.9 ppm ionic chloride

EXAMPLE 6

When procedure of Example 1 is repeated except that the sodium salt of poly(ethylene glycol) (PEG 400) is used instead of potassium tert-butylate, the ECN resin obtained analyses as follows:
 86 ppm hydrolyzable chlorine
 0.4 ppm ionic chloride

EXAMPLE 7

The procedure of Example 1 is repeated with a crude EPN resin solution. The epoxy phenol novolac (EPN) resin product obtained has low hydrolyzable chlorine and low ionic chloride contents.

EXAMPLE 8

To a 2-liter bottom-outlet flask fitted with an agitator, thermometer and condenser is charged 1036 grams of a 40% by weight solution in toluene of an epoxy cresol novolac resin containing 200 ppm of hydrolyzable chlorine. (The toluene solution is previously dried by azeotropic distillation to a water content of less than 0.05% by weight). The toluene solution is heated to 105° C. and 7.3 grams of a 14% by weight solution of potassium tert-butylate in tert-butanol is added. The mixture is stirred for 15 minutes at 105° C., and then is cooled to 80° C. To the 80° C. solution is added 200 ml of cold water which lowers the temperature of the mixture further to 60° C. Small chunks of solid carbon dioxide (dry ice) are added until the pH of a sample diluted with water and acetone is 6.3. The milky white emulsion is then passed through a liquid/liquid phase separating centrifuge to yield a toluene phase containing 13 ppm hydrolyzable chloride, 23 ppm ionic chloride and 0.98% by weight of water.

To the toluene solution (916 grams) is added 4.6 grams of powdered cellulose ("Solka Floc"), 4.6 grams of diatomaceous earth ("Celite" 535) and 9.2 grams of neutral attapulgite clay (clay 100 Up/RVM). The water present is partially removed by azeotropic distillation under vacuum at 60° C. to 0.5% by weight. The resulting toluene solution is filtered through a precoated pressure filter (as in Example 1). The toluene solution filtrate contains 19 ppm hydrolyzable chlorine and 0.3 ppm ionic chloride.

The toluene solvent is removed by vacuum distillation to give the desired ECN resin having 34 ppm hydrolyzable chlorine and 0 ppm ionic chloride.

EXAMPLE 9

When the procedure of Example 1 is repeated with methyl isobutyl ketone instead of toluene, the ECN resin obtained analyses as follows:
 29 ppm hydrolyzable chlorine
 0.3 ppm ionic chloride

EXAMPLE 10

When the procedure of Example 8 is repeated with methylisobutyl ketone instead of toluene, the ECN resin obtained analyses as follows:
 49 ppm hydrolyzable chlorine
 0.7 ppm ionic chloride

What is claimed is:

1. A process for making an epoxy novolac resin with a hydrolyzable chlorine content under 100 ppm and with an ionic chloride content of under 1 ppm, which comprises dissolving the crude epoxy novolac resin, prepared by the reaction of a novolac resin with epichlorohydrin in an alkaline medium, in an inert organic solvent, reducing the water content of the organic solution to less than 0.1% by weight, adding to the essentially anhydrous solution an alkali metal alkoxide, dissolved in an alkanol or in another suitable solvent, in an amount which is 105–200% of the theoretical equivalent amount required to complete the dehydrochlorination reaction, based on the content of hydrolyzable chlorine in the crude resin, at a temperature of 20°–140° C., adding 0.2 to 2% by weight of water, based on the crude resin solution, neutralizing the excess alkali metal alkoxide by the addition of a weak acid at 20°–50° C. until a pH value of 3 to 6 is attained, removing the alkali metal salt formed by treatment with from 0.5 to 5% by weight of the crude resin solution of a filter aid or mixture of filter aids followed by filtration, and isolating the epoxy novolac resin by vacuum distillation of the inert organic solvent at a temperature of 100°–200° C.

2. A process according to claim 1 wherein the epoxy novolac resin is an epoxy phenol novolac resin.

3. A process according to claim 1 wherein the epoxy novolac resin is an epoxy cresol novolac resin.

4. A process according to claim 1 wherein the inert organic solvent is toluene, xylene or methyl isobutyl ketone.

5. A process according to claim 1 wherein the alkali metal alkoxide is sodium methylate, sodium ethoxide, sodium n-propylate, sodium isopropylate, potassium n-propylate, potassium isopropylate, sodium tert-butylate, potassium tert-butylate, sodium tert-amylate, potassium tert-amylate, sodium or potassium salt of 2-methoxyethanol, of 2-butoxyethanol or of poly(ethylene glycol) (PEG 400).

6. A process according to claim 5 wherein the alkali metal alkoxide is potassium tert-butylate.

7. A process according to claim 5 wherein the alkali metal alkoxide is sodium methylate.

8. A process according to claim 5 wherein the alkali metal alkoxide is potassium tert-amylate.

9. A process according to claim 1 wherein the alkali metal alkoxide is dissolved in methanol, tert-butanol or toluene.

10. A process according to claim 1 wherein neutralization and filter aid treatment are carried out in the presence of 0.5 to 1% by weight of water, based on the crude resin solution.

11. A process according to claim 1 wherein the weak acid is carbonic acid, acetic acid or an acidic clay.

12. A process according to claim 1 wherein the filter aid is fibrous cellulose, diatomaceous earth, attapulgite, bentonite, montmorillonite or acid-treated bentonite, or mixtures thereof.

13. A process according to claim 12 wherein the filter aid is fibrous cellulose, diatomaceous earth, attapulgite, bentonite or montomorillonite or mixtures thereof.

14. A process according to claim 1 wherein the vacuum distillation of the inert organic solvent is carried out at a temperature of 130°–135° C.

* * * * *